(12) United States Patent
Tobin

(10) Patent No.: US 8,937,497 B1
(45) Date of Patent: Jan. 20, 2015

(54) POWER SUPPLY MONITOR

(71) Applicant: Analog Devices, Inc., Norwood, MA (US)

(72) Inventor: David Tobin, Austin, TX (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 13/951,728

(22) Filed: Jul. 26, 2013

Related U.S. Application Data

(60) Provisional application No. 61/756,615, filed on Jan. 25, 2013.

(51) Int. Cl.
*G01R 7/00* (2006.01)
*G01R 19/165* (2006.01)

(52) U.S. Cl.
CPC .... *G01R 19/16538* (2013.01); *G01R 19/16576* (2013.01); *G01R 19/16504* (2013.01)
USPC .......................................... 327/56

(58) Field of Classification Search
USPC ............................. 327/56, 63–70, 77–81, 90
See application file for complete search history.

(56) References Cited

U.S. PATENT DOCUMENTS

2012/0286591 A1  11/2012  Schiemann et al.

OTHER PUBLICATIONS

Soldano, Marco, "Power Monitoring in Server Power Supplies," Challenges and Opportunities, IBM 2007 Power and Cooling Symposium, Raleigh, NC, 22 pages.
128-Position I2C-Compatible Digital Potentiometer, AD5247, Data Sheet, © 2003-2013 Analog Devices, Inc., http://www.analog.com/static/imported-files/data_sheets/AD5247.pdf, 20 pages.
1025-/256-Position, 1% Resistor Tolerance Error, I2C Interface and 50-TP Memory Rheostat, AD5272/AD5274, Data Sheet, http://www.analog.com/static/imported-files/data_sheets/AD5272_5274.df, © 2009-2013 Analog Devices, Inc., 28 pages.
Zero Drift, Unidirectional Current Shunt Monitor, AD8219, http://www.analog.com/static/imported-files/data_sheets/AD8219.pdf © 2011, Analog Devices, Inc., 12 pages.
1.8 V Low Power CMOS Rail-to-Rail Input/Output Operational Amplifier, AD8515, http://www.analog.com/static/imported-files/data_sheets/AD8515.pdf, © 2002-2007 Analog Devices, Inc., 16 pages.
General-Purpose Comparators, ADCMP370/ADCMP371, http://www.analog.com/static/imported-files/data_sheets/ADCMP370_371.pdf, © 200-2011 Analog Devices, Inc., 12 pages.

(Continued)

*Primary Examiner* — Sibin Chen
(74) *Attorney, Agent, or Firm* — Patent Capital Group

(57) ABSTRACT

An electrical circuit includes a comparator that receives a first signal at a first input pin, where the first signal is indicative of a current drawn from a power supply unit (PSU) that delivers power to an electronic component. The comparator substantially simultaneously receives a second signal at a second input pin, where the second signal is indicative of a voltage provided by the PSU to the electronic component and is set to a predetermined threshold. An output of the comparator changes if a difference exists between the first signal and the second signal. The electrical circuit includes a variable gain amplifier that provides the first signal to the comparator, where a gain of the variable gain amplifier is set according to the predetermined threshold.

20 Claims, 3 Drawing Sheets

(56) References Cited

OTHER PUBLICATIONS

Power Supply Monitor with Reset, ADM709, http://www.analog.com/static/imported-files/data_sheets/ADM709.pdf, © 1995 Analog Devices, Inc., 4 pages.

Precision Micropower Shunt Mode Voltage References, ADR5040/ ADR5041/ ADR5043/ ADR5044/ ADR5045, Data Sheet, http://www.analog.com/static/imported-files/data_sheets/ADR5040_5041_5043_5044_5045.pdf, © 2007-2012 Analog Devices, Inc., 16 pages.

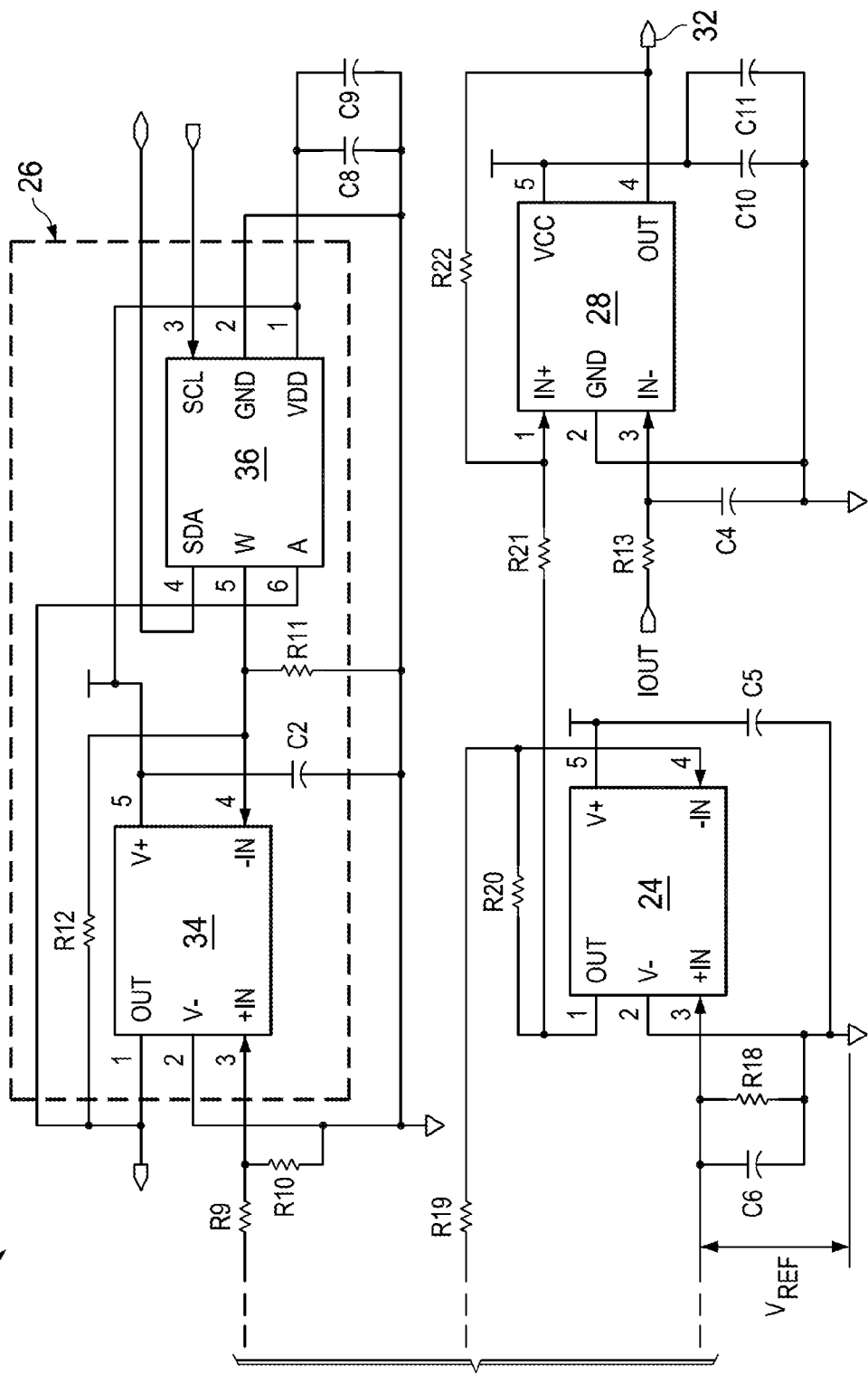

POWER SUPPLY MONITOR

PRIORITY DATA

This application claims the benefit of priority under 35 U.S.C. §119(e) to U.S. Provisional Application Ser. No. 61/756,615, filed Jan. 25, 2013, which is hereby incorporated by reference in its entirety.

FIELD OF THE DISCLOSURE

This disclosure relates in general to the field of electronic devices and, more particularly, to a power supply monitor.

BACKGROUND

Data and telecommunications consumer and infrastructure equipment such as portable handheld devices (e.g., mobile phones), consumer electronics equipment, hybrid and electrical vehicles, smart grid, and medical equipment, are driving growth for power management chips over the next several years. Power management semiconductor products include voltage regulators and references, power interface ICs, application-specific power management ICs, power transistors and thyristors, among others. Moreover, many of today's advanced data and telecommunications infrastructure equipment is driven by powerful processors with low core-voltage supplies. Power monitoring integrated circuits (ICs) monitor processor cores to ensure they operate within voltage tolerance specifications, allowing power and system engineers to maximize system uptime and optimize system performance.

Overview

A power monitor supply is provided and includes an electrical circuit including a comparator that receives a first signal at a first input pin, where the first signal is indicative of a current drawn from a power supply unit (PSU) that delivers power to an electronic component. The comparator substantially simultaneously receives a second signal at a second input pin, where the second signal is indicative of a voltage provided by the PSU to the electronic component. The second signal can be set to a predetermined threshold. An output of the comparator changes if a difference exists between the first signal and the second signal. The electrical circuit includes a variable gain amplifier that provides the first signal to the comparator, where a gain of the variable gain amplifier is set according to the predetermined threshold. In some embodiments, the variable gain may be achieved in the voltage path (e.g., rather than with a fixed voltage output). In various embodiments, the difference between the first signal and the second signal remains constant for a constant power drawn by the electronic component from the PSU.

In specific embodiments, a plurality of amplifiers may be included in the electrical circuit. The plurality of amplifiers measures a differential of a portion of the voltage from a reference voltage, and outputs the reference voltage if the differential is zero and otherwise adjusts the output reference voltage by the differential amount. The output may be provided as the second signal to the comparator. In some embodiments, the plurality of amplifiers can include a non-inverting unity gain buffer amplifier and an inverting voltage amplifier. The non-inverting unity gain amplifier may provide the portion of the voltage to the inverting voltage amplifier, and the inverting voltage amplifier may generate the second signal as its output. In some embodiments, the reference voltage is substantially stable and is provided by a voltage reference source. In particular embodiments, the portion of the voltage can comprise 10% of the voltage. In other embodiments, the reference voltage can be any suitable value lower than the $V_{in}$ and within the rails of the amplifiers.

In specific embodiments, the gain of the variable gain amplifier can be set with a variable resistor, such as a digital potentiometer. The electrical circuit can further include a current sense amplifier that measures the current and converts the current to another voltage that is provided to the variable gain amplifier, which amplifies the another voltage according to the gain to generate the first signal.

In some embodiments, the comparator can include hysteresis, which can depend on the electrical configuration (e.g., design) of the circuit. For example, the hysteresis may be 0.5% of the power rating of the PSU, depending on the particular circuit configuration. In various embodiments, the predetermined threshold can be indicative of a power rating of the PSU. For example, the predetermined threshold can be set to indicate a maximum load on the PSU is approximately 100% of the PSU's power rating. In a specific embodiment, the output of the comparator is pulled high when the predetermined threshold is exceeded. The output of the comparator can provide a throttling signal and/or alert signal (e.g., warning signal, alarm signal, etc.) to the electronic component.

According to some embodiments of the electrical circuit, a response time of the electrical circuit is less than 10 μs. In a general sense, the response time of the electrical circuit can vary with (or be limited by) the bandwidth of the amplifiers and the propagation delay of the comparator, and can be configured to be any desired value, based on particular application needs. The voltage and the current are measured substantially simultaneously, and substantially all current and voltage measurements and comparisons are performed in an analog domain (e.g., without using digital computations, such as with a microprocessor). Being in the analog domain, the tolerance of the electrical circuit can vary substantially with the tolerances and offsets of its analog components.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 3A and 3B are simplified schematic diagrams illustrating example details of the power supply monitor according to one embodiment.

DETAILED DESCRIPTION OF EXAMPLE EMBODIMENTS

Figure 1:
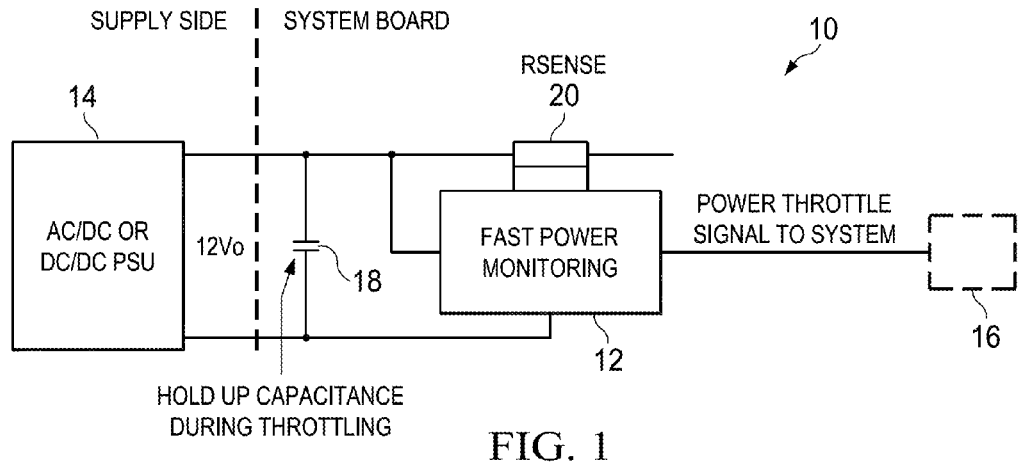
FIG. 1 is a simplified block diagram of a power supply monitor in accordance with one embodiment.

The present disclosure provides for a power supply monitor to an electronic device. Electronic devices, such as servers and laptop computers are increasingly used by consumers and businesses. The devices are typically powered by an internal rechargeable battery that can be charged using an external power supply. In some cases, the external power supply may output a direct current (DC) voltage typically in the range of 7.5-24 volts, although the voltage values can vary widely (e.g., 7V-400V) depending on the particular electrical/electronic system in which the external power supply is used. The external power supply can charge the battery and power the laptop simultaneously; when the battery is fully charged, the laptop continues to run on power supplied by the external power supply. As such, reliability of the power supply to the device, whether internal from the battery, or external from an alternating current (AC) source, can be a major concern.

A power supply unit (PSU) typically converts external AC to low-voltage regulated DC power for the internal components (e.g., processor, peripheral devices) of the electronic device. PSUs can include power distribution units (PDUs) or point of load (PoL) sources within the broad scope of the embodiments described herein. Energy efficient PSUs waste less energy in heat, and require less airflow to cool, and as a result run quieter. In general, PSUs are about 70-80% efficient. Some high-end consumer PSUs can exceed 90% efficiency at optimal load levels, though they can fall to 87-89% efficiency during heavy or light loads. The ENERGY STAR computer specification requires at least 80% efficiency at 20%, 50% and 100% of the rated output capacity, effectively providing a window of high efficiency that extends from 20% to 100% of the rated capacity of the PSU. Generally the efficiency of the PSU drops off significantly as the load falls below 20%. Because the power supply is one of the largest contributors to power loss in the electronic device, it is important to maximize the efficiency in order to comply with the power targets for the various system categories.

Some PSUs are over-designed with an additional 5% margin, so that the maximum load on the PSU due to the components in the electronic device is set to 95% of the PSU capability. Although an overly large power supply will have an extra margin of safety against overloading, such a larger unit is often less efficient at lower loads, and therefore wastes more electricity than a more appropriately sized unit. For instance, an 80 PLUS 520 watt supply is 70% less efficient at 60 watts, which is the typical idle power for a desktop computer. To allow for better utilization of the PSU, PSU capability can be set closer to 100%. To this end, a fast power monitoring circuit that can achieve close to 100% capability could provide the added advantage of less false over-power triggering.

In general, the power supply monitors may monitor both voltage and current, but provide an output signal (e.g., interrupt signal, reset signal, etc.) when the voltage (or alternatively, current) drops below a predefined cutoff threshold. The predefined cutoff threshold is typically not based on power, which is a product of voltage and current, and therefore requires simultaneous voltage and current sensing. For example, switched-mode power supplies employ a feedback controller that monitors current drawn by the load to keep the output voltage constant. In another example, the power supply monitor senses voltage and reacts accordingly. An example power supply monitor in Analog Device's ADM709 generates a system reset during power-up, power-down and brownout conditions whenever the supply voltage is below a reset threshold.

In systems where fast (e.g., of the order of 10 μs or less) monitoring and response is desired, simultaneous sampling of voltage and current is needed. At least one currently available power supply monitor can simultaneously monitor both voltage and current from the PSU, and perform computations digitally to determine if the power rating of the PSU has been exceeded. The digital computations (e.g., multiplying voltage and current to obtain the power drawn by the load, and comparing with a predetermined power threshold) may be performed by a microprocessor, and as such, the power supply monitor can be expensive. In addition, the digital computations can be slow and may not entirely satisfy fast power monitoring requirements of some electronic devices.

Turning to FIG. 1, FIG. 1 is a simplified block diagram of a system 10 including a power supply monitor 12 that can provide fast power monitoring, among other features. PSU 14 may supply power to electronic component 16 (e.g., comprising a portion of an electronic device, such as a server, data storage or communication equipment, laptop computer or mobile smart-phone). In some embodiments, PSU 14 may comprise an AC power supply. In other embodiments, PSU 14 may comprise a DC power supply. In some embodiments, PSU 14 may comprise both AC and DC power supplies. In some embodiments, capacitor 18 and shunt resistor (Rsense) 20 can also be included, for various purposes.

Embodiments of power supply monitor 12 can substantially instantaneously measure power consumption by electronic component 16, compare against the power rating (e.g., PSU capability) of PSU 14 and throttle electronic component 16 when the power rating is exceeded. In some embodiments, the power information target time (e.g., time to respond after measuring power) may be 10 μs or lower, and any suitable target time may be used within the broad scope of the embodiments. Embodiments of power supply monitor 12 may substantially simultaneously sample both voltage and current. The output of power supply monitor 12 can provide the throttling signal to electronic component 16.

In various embodiments, electronic component 16 can include any suitable electronic device, including computing device and mobile device, and parts thereof. By way of examples and not limitations, electronic component 16 can include a microprocessor, a digital signal processor, an application specific integrated circuit, a field programmable gate array, or other suitable processor or processor-like devices. Electronic component 16 can also include a system such as a server, data storage equipment, communications equipment, a desktop computer, or a laptop computer. Electronic component 16 can also include peripheral devices, such as monitors, keyboards, etc. Electronic component 16 can also include mobile phones, or parts thereof. Virtually any electronic system, device, or part thereof may be included within the broad scope of the term "electronic component."

In various embodiments, PSU 14 can convert AC signals to DC signals. In other embodiments, PSU may generate AC signals, and components such as AC-to-DC converters may convert the AC signals to DC signals. PSU 14 may include any suitable type of power supply unit, including switched-mode power supply, variable power supply, etc. Typical PSUs may provide a 12V voltage to electronic component 16. Other voltage values (e.g., 3V, 5V, 18V, etc.) may also be included within the broad scope of the embodiments. Note that FIG. 1 is simplified for ease of illustration. Various other passive and active components, such as diodes, reference voltage supplies, op-amps, comparators, various integrated circuits, transformers, resistors, capacitors, inductors and transistors may be included without departing from the broad scope of the embodiments.

Figure 2:
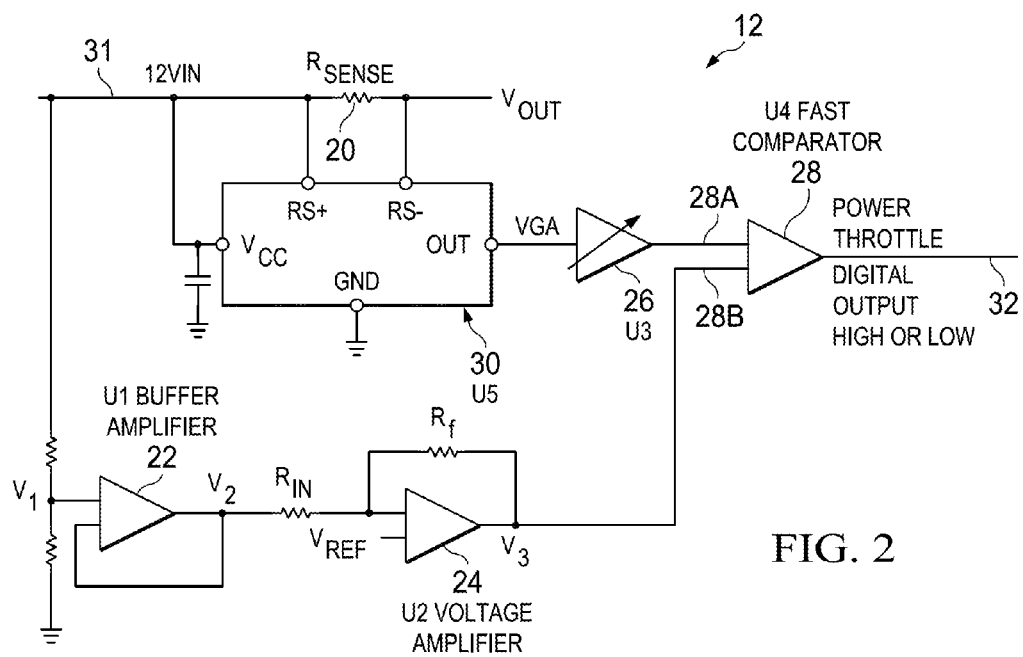
FIG. 2 is a simplified circuit diagram of example details of the power supply monitor according to one embodiment.

Turning to FIG. 2, FIG. 2 is a simplified block diagram illustrating example details of an embodiment of power supply monitor 12. According to various embodiments, monitoring and computations relevant to the power supply monitor functionalities may be performed substantially in an analog domain (e.g., without the use of digital processors, such as microprocessors, digital signal processors, etc.). In the example embodiment illustrated in the figure, power supply monitor 12 includes amplifiers 22 (e.g., buffer amplifier) and 24 (e.g., voltage amplifier), a variable gain amplifier (VGA) 26, a comparator 28, and a current sense (or shunt) amplifier 30. A 12V input rail 31 provides voltage from PSU 14 to electronic component 16. The term "variable gain amplifier" encompasses an amplifier (e.g., electrical circuit that increases the power of an electrical signal) that varies its gain (e.g., a measure of the ability of the electronic amplifier to increase the power or amplitude of the input electrical signal by adding energy) depending on a control voltage. As used herein, "gain" refers to voltage gain. As used herein, the term "comparator" refers to an electronic circuit for comparing two electrical signals.

Comparator 28 may receive a first signal at a first input pin 28A. The first signal is indicative of a current drawn by electronic component 16 from PSU 14. Comparator 28 may substantially simultaneously receive a second signal at a second input pin 28B. The second signal is indicative of a voltage provided by PSU 14 to electronic component 16. In many embodiments, plurality of amplifiers 22 and 24 may measure a differential of a portion of the voltage from a reference voltage Vref and provide the reference voltage adjusted by the differential as the second signal to comparator 28. As used herein, the term "adjusted by" can include an addition operation, a subtraction operation, addition of a product of the differential and gain of amplifier 24, or subtraction of the product of the differential and gain of amplifier 24. In some embodiments, amplifier 24 can be realized as a VGA.

According to embodiments of power supply monitor 12, an output 32 of comparator 28 changes if a difference exists between the first signal and the second signal, which can be set to a predetermined threshold. In many embodiments, the predetermined threshold is indicative of the power rating of PSU 14. In specific embodiments, the predetermined threshold may be set so that a maximum load on PSU 14 is approximately 100% of PSU 14's power rating. Output 32 of comparator 28 can provide a throttling signal or other suitable signal (e.g., reset signal, warning signal, alert signal, etc.) to electronic component 16. For example, output 32 of comparator 28 is pulled high when the first signal exceeds the predetermined threshold; when output 32 is pulled high, electronic component 16 may throttle (e.g., decrease, choke, stifle, block) the power drawn from PSU 14. In various embodiments, different output signals may be obtained when output 32 is pulled low, or pulsed or reset, based on particular needs.

In various embodiments, the plurality of amplifiers that provides the second signal to comparator 28 can include amplifiers 22 and 24. A portion (e.g., equal to the reference voltage) of 12V input rail 31 may be fed to amplifiers 22 and 24. Substantially stable reference voltage Vref may be provided at amplifiers 22 and 24 and set, in some embodiments, according to the input voltage at amplifier 22 from input rail 31. Vref may be provided, in some embodiments, from a high precision shunt voltage reference, such as ADR5041A (or other suitable reference voltage source). The input voltage to amplifiers 22 and 24 may be reduced according to the Vref value, and the output provided to comparator 28 as the second signal. In some embodiments, the input voltage may be increased within a common mode input range of the amplifiers.

In some embodiments, amplifier 22 may comprises a unity gain buffer amplifier. Amplifier 22 may be constructed by applying a full series negative feedback to an operational amplifier (op-amp) by connecting its output to its differential (e.g., inverting) input, and connecting the signal source to the non-inverting input. In this configuration, the input voltage $V_1$ and the output voltage $V_2$ are subtracted according to Kirchhoff's voltage law and their difference is applied to the op-amp differential input. The connection forces amplifier 22 to adjust its output voltage to equal the input voltage ($V_2$ follows $V_1$). Amplifier 22 may have high input impedance; thus, the input of amplifier 22 may not load voltage rail 31 and consequently, amplifier 22 may draw only minimal current from PSU 14. Moreover, because the output impedance of amplifier 22 is low, it drives amplifier 24 as if it were a perfect voltage source. In some embodiments, amplifier 24 may comprise an inverting voltage amplifier that inverts and scales the input voltage $V_2$. For example, the output voltage $V_3$ of amplifier 24 is $\{Vref-(V_2-Vref)(R_f/R_{in})\}$. The output voltage $V_3$ at amplifier 24 may be provided to input pin 28B of comparator 28. In an example embodiment, AD8515 may be used for amplifiers 22 and 24 in appropriate configurations.

In many embodiments, VGA 26 may provide the first signal to comparator 28. Current sense amplifier 30 may measure current across shunt resistor Rsense 20, convert the current to voltage and output an amplified (e.g., gain of 10, 60, etc.) voltage at its output pin OUT. Current sense amplifier 30 can amplify a small differential input voltage generated by the load current flowing through shunt resistor Rsense 20. In some embodiments, current sense amplifier 30 may reject high common-mode voltages (e.g., up to 80 V) and provide a ground referenced, buffered output. In some embodiments, current sense amplifier 30 can be configured as a difference amplifier. An example of current sense amplifier 30 is Analog Device's AD 8219 amplifier, which comprises a high voltage, high voltage, high resolution, current shunt amplifier, with a set gain of 60 V/V, −4V to 80V operating voltage range.

VGA 26 may amplify the output from current sense amplifier 30 and feed the resultant signal to comparator 28 as the first signal at input pin 28A. VGA 26 may be programmed (e.g., in a digital domain, for example, using DigiPOT, a digital potentiometer, or using digital variable gain amplifier (DVGA)) to vary the gain of its output such that comparator 28 may be triggered at various power levels (e.g., power ratings, thresholds, etc.) to provide digital output 32 that throttles electronic component 16. In various embodiments, VGA 26 can comprise an amplifier (e.g., rail-to-rail single supply voltage amplifier) and a variable resistor (e.g., potentiometer). An example amplifier that can be used in VGA 26 includes Analog Device's AD8515, in conjunction with AD5247 (which performs the same electronic adjustment function as a mechanical potentiometer or a variable resistor), or AD5272 (which is a digital rheostat).

Comparator 28 can compare the two voltages at its two input pins 28A and 28B. Comparator 28 can be configured to be positive, wherein output 32 is pulled high when input voltage at input pin 28A is greater than input voltage at input pin 28B. In some embodiments, comparator 28 can be configured to be negative, wherein output 32 is pulled low when input voltage at input pin 28A is greater than input voltage at input pin 28B. It may be noted that comparator 28 may be configured with inputs swapped to provide the opposite logic as described herein. An example of comparator 28 includes ADCMP 371. In a basic configuration, comparator 28 can be used to convert one or more analog input signals (e.g., at input pins 28A and 28B) into a digital signal (e.g., output 32). The analog signal on IN+ (e.g., input pin 28A) is compared to the voltage on IN− (e.g., input pin 28B), and the voltage at OUT is either high or low, depending on whether IN+ is at a higher or lower potential than IN−, respectively. In some embodiments, an external resistor may be used to pull output 32 to a logic high voltage when the output transistor is switched off. In other embodiments, comparator 28 may include a push-pull output stage, which has an internal push-pull component (e.g., PMOS) and may not require an external resistor.

The voltage at input pin 28A is essentially an indication of current across Rsense 20; the voltage at input pin 28B is essentially an indication of voltage at input voltage rail 31. Assume that Rsense 20 has a resistance of 0.1Ω, so that a current across Rsense 20 of 10 Amps generates a voltage of 1V at pins RS+ and RS− of current sense amplifier 30.

Assume that the gain of current sense amplifier 30 is set to 1, so that output voltage at its OUT pin is 1V. Assume that VGA 28 has a gain of 1, so that voltage at input pin 28A is 1V. Assume that Vref is set to 1.5V, so that voltage at input pin 28B is 1.5V. Assume that power drawn by electronic component 16 increases as a result of increased current drawn from PSU 14, while the voltage remains constant. The current across Rsense 20 increases to 20 Amps (e.g., due to larger current drawn by electronic component 16). Consequently, voltage at input pin 28A increases to 2V, whereas voltage at input pin 28B remains at 1.5V. Because voltage at input pin 28A is greater than voltage at input pin 28B by hysteresis plus 1.5V, output 32 may be pulled high indicating that electronic component 16 should throttle back.

In various embodiments, the difference between the first signal and the second signal at comparator 28 may remain constant for a constant power drawn by electronic component 16 from PSU 14. For example, if the voltage at input rail 31 decreases, the output at amplifier 22 decreases (e.g., as amplifier 22 is non-inverting), whereas output at amplifier 24 increases (e.g., as amplifier 24 is inverting). For example, if voltage at input rail 31 decreases by 10%, $V_1$ at amplifier 22 decreases by 10%, $V_2$ decreases by 10% (assuming a gain of 1 at amplifier 22), and $V_3$ at amplifier 24 increases by 10% (assuming a gain of 1 at amplifier 24), leading to an increase in the second signal at input pin 28B by 10%. However, when voltage at input rail 31 drops by 10%, current simultaneously increases by 10% across Rsense 20 for a constant power drawn by electronic component 16. Thus, voltage at input pin 28A also increases by 10%, cancelling out the 10% increase in voltage at input pin 28B at comparator 28. Thus, comparator 28 continues to see the same differential across pins 28A and 28B as before the 10% change in voltage and current, as long as the power drawn by electronic component 16 remains constant. When the power drawn by electronic component 16 changes, the voltage differential across pins 28A and 28B changes, which can lead to a difference in output 32 based on the predetermined threshold of the second signal.

In some embodiments, output 32 remains at a default state (or zero) (e.g., unchanged from a logic low voltage, or a logic high voltage) if power draw by electronic component 16 does not exceed the power threshold set at comparator 28. When power draw by electronic component 16 exceeds the predetermined threshold at comparator 28 (as set by the variable gain of VGA 26), output 32 is pulled high (or low, depending on the setting of comparator 32) from its default state. The change in output 32 may be sensed by electronic component 16 and electronic component 16 may react accordingly. For example, the power draw may be throttled, so that the power capability of PSU 14 is not exceeded.

In some embodiments, comparator 28 may include hysteresis, so that output 32 is not pulled up or down based on noise. Small voltage fluctuations due to noise can cause undesirable rapid changes between the voltages at pins 28A and 28B, especially if electronic component 16 is drawing power approximately close to the power rating of PSU 14 or the predetermined threshold. To prevent output oscillation in such scenarios, a small hysteresis of a few millivolts, such as indicative of 0.5% (or other suitable value) of power rating, can be integrated into comparator 28. In some embodiments, hysteresis can be built external to comparator 28, for example, using positive feedback from the output to the non-inverting input of comparator 28. Some embodiments can also include programmable hysteresis without feedback, or a dedicated hysteresis pin, or other mechanism to provide hysteresis.

Embodiments of power supply monitor 12 can substantially simultaneously sample both voltage and current and provide a throttling signal to electronic component 16 when the sensed power exceeds a predetermined threshold. In various embodiments, the speed of power supply monitor 12 may be substantially proportional to the speed of its individual components. Thus, power supply monitor 12 may be configured to respond at 10 μs or less (or other suitable value) by choosing components (e.g., current sense amplifier 30, amplifiers 22 and 24, comparator 28, VGA 26) that can process signals as fast as desired. Because measurements and comparisons are performed in the analog domain, there is no latency similar to latency encountered when performing digital computations using digital components, such as microprocessors. Embodiments of power supply monitor 12 can provide a fast solution (e.g., with no latency), with small signal bandwidth in MHz (e.g., when comparator propagation delay is in a nano second range). Embodiments of power supply monitor 12 can provide an accurate solution, whose tolerance may depend merely on resistor tolerances, amplifier offsets, etc. The circuit architecture of power supply monitor 12 may be simple, with minimal software programming requirements, and cheap, with major components that can be sourced from multiple sources.

Figure 3A:
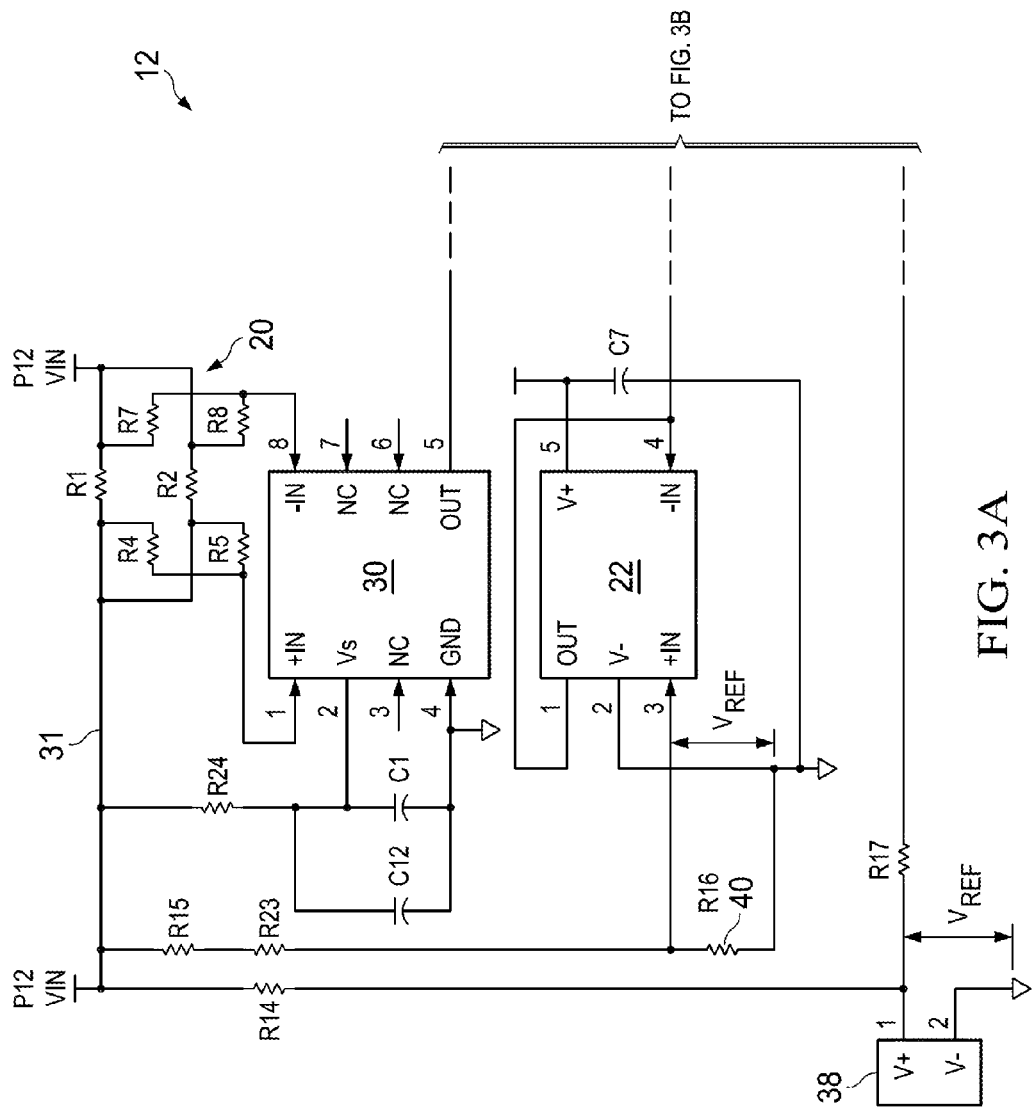

Turning to FIGS. 3A and 3B, FIGS. 3A and 3B are simplified schematic diagrams illustrating example details of an embodiment of power supply monitor 12. The example schematic substantially tracks the components illustrated in FIG. 2. Rsense 20 may be implemented as a plurality of resistors configured to provide at least two terminals to current sense amplifier 30 for measuring voltage across Rsense 20. In some embodiments, VGA 26 may be implemented using an amplifier 34 and a variable resistor 36. In a specific embodiment, variable resistor 36 may comprise a digital potentiometer, wherein device wiper settings may be controllable through an I²C-compatible digital interface or a serial peripheral interface (SPI) bus. The resistance value may be adjusted as desired and programmed into a memory element within variable resistor 36. The gain of variable gain amplifier 26 can be set according to the predetermined threshold by varying the resistance of variable resistor 36.

A voltage reference source 38 (e.g., ADR5041A) may provide a substantially stable Vref. In some embodiments, voltage reference source 38 may comprise a stack of multiple voltage reference sources that are stacked together to obtain a desired voltage. In some embodiments, voltage reference source 38 may comprise an adjustable precision voltage source. Resistor 40 may be configured (e.g., selected, chosen) so that the voltage across resistor 40 is Vref. In various embodiments, substantially all resistors in electrical circuit 10 may be programmable. Various resistors and capacitors may also be included to accommodate appropriate response times, efficiency, latency, hysteresis, and other peripheral functions as desired and based on particular needs.

In the discussions of the embodiments above, the capacitors, clocks, DFFs, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the amplification functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors and memory elements, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular component arrangements. Various modifications and changes may be made to such embodiments without departing from the scope of the appended claims. The description and drawings are, accordingly, to be regarded in an illustrative rather than in a restrictive sense.

Note that the activities discussed above with reference to the FIGURES are applicable to any integrated circuits that involve signal processing, particularly those that can execute specialized software programs, or algorithms, some of which may be associated with processing digitized real-time data. Certain embodiments can relate to multi-DSP signal processing, floating point processing, signal/control processing, fixed-function processing, microcontroller applications, etc.

In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems. Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc.

In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily part of smartphones, tablets, security systems, PCs, gaming technologies, virtual reality, simulation training, etc.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Note that all optional features of the apparatus described above may also be implemented with respect to the method or process described herein and specifics in the examples may be used anywhere in one or more embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims. The 'means for' in these instances (above) can include (but is not limited to) using any suitable component discussed herein, along with any suitable electronic component, electrical circuit, logic gate, PSU, PDU, PoL, software, hub, computer code, logic, algorithms, hardware, controller, interface, link, bus, communication pathway, etc.

What is claimed is:

1. An electrical circuit, comprising:
a comparator that receives a first signal at a first input pin, wherein the first signal is indicative of a current drawn from a power supply unit (PSU), wherein the PSU delivers power to an electronic component, wherein the comparator receives a second signal at a second input pin, wherein the second signal is indicative of a voltage provided by the PSU to the electronic component and is set to a predetermined threshold, wherein an output of the comparator changes if a difference exists between the first signal and second signal; and
a variable gain amplifier that provides the first signal to the comparator, wherein a gain of the variable gain amplifier is set according to the predetermined threshold.

2. The electrical circuit of claim 1, further comprising:
a plurality of amplifiers that measures a differential of a portion of the voltage from a reference voltage and provide the reference voltage adjusted by the differential as the second signal to the comparator.

3. The electrical circuit of claim 2, wherein the plurality of amplifiers comprises:
a non-inverting unity gain buffer amplifier; and
an inverting voltage amplifier, wherein the non-inverting unity gain amplifier provides the portion of the voltage to the inverting voltage amplifier, wherein the inverting voltage amplifier generates the second signal as its output.

4. The electrical circuit of claim 2, wherein the reference voltage is substantially stable, wherein the reference voltage is provided by a voltage reference source.

5. The electrical circuit of claim 2, wherein the portion comprises voltage within a common mode voltage range of the amplifiers and the comparator.

6. The electrical circuit of claim 1, wherein the difference between the first signal and the second signal remains constant for a constant power drawn by the electronic component from the PSU.

7. The electrical circuit of claim 1, wherein the gain of the variable gain amplifier is set with a variable resistor.

8. The electrical circuit of claim 7, wherein the variable resistor is at least one of a digital potentiometer and a digital variable gain amplifier.

9. The electrical circuit of claim 1, further comprising:
a current sense amplifier that measures the current and converts the current to another voltage that is provided to the variable gain amplifier, wherein the variable gain amplifier amplifies the another voltage according to the gain to generate the first signal.

10. The electrical circuit of claim 1, wherein the comparator includes hysteresis.

11. The electrical circuit of claim 1, wherein the predetermined threshold is indicative of a power rating of the PSU.

12. The electrical circuit of claim 1, wherein the predetermined threshold is set to indicate a maximum load on the PSU is approximately 100% of the PSU's power rating.

13. The electrical circuit of claim 1, wherein the change to the output of the comparator when the predetermined threshold is exceeded includes at least one action selected from a group consisting of pulling high, pulling low, pulsing, or resetting.

14. The electrical circuit of claim 1, wherein the output of the comparator provides a throttling signal to the electronic component.

15. The electrical circuit of claim 1, wherein the voltage and the current are measured concurrently.

16. The electrical circuit of claim 1, wherein substantially all current and voltage measurements and comparisons are performed in an analog domain.

17. The electrical circuit of claim 1, wherein a tolerance of the electrical circuit varies substantially with tolerances and offsets of its analog components.

18. The electrical circuit of claim 1, wherein the PSU includes at least one of an alternating current source or a direct current source.

19. A method comprising:
providing a first signal from a variable gain amplifier to a comparator at a first input pin, wherein the first signal is indicative of a current drawn from a PSU, wherein the PSU delivers power to an electronic component; and
providing a second signal at a second input pin to the comparator, wherein the second signal is indicative of a voltage provided by the PSU to the electronic component and is set to a predetermined threshold, wherein an output of the comparator changes if a difference exists between the first signal and second signal, wherein a gain of the variable gain amplifier is set according to the predetermined threshold.

20. An electrical circuit, comprising:
means for providing a first signal from a variable gain amplifier to a comparator at a first input pin;
a power supply means, wherein the first signal is indicative of a current drawn from the power supply means, wherein the power supply means delivers power to an electronic component; and
means for providing a second signal at a second input pin to the comparator, wherein the second signal is indicative of a voltage provided by the power supply means to the electronic component and is set to a predetermined threshold, wherein an output of the comparator changes if a difference exists between the first signal and second signal, wherein a gain of the variable gain amplifier is set according to the predetermined threshold.

* * * * *